INVENTOR.
BERT A. COSS

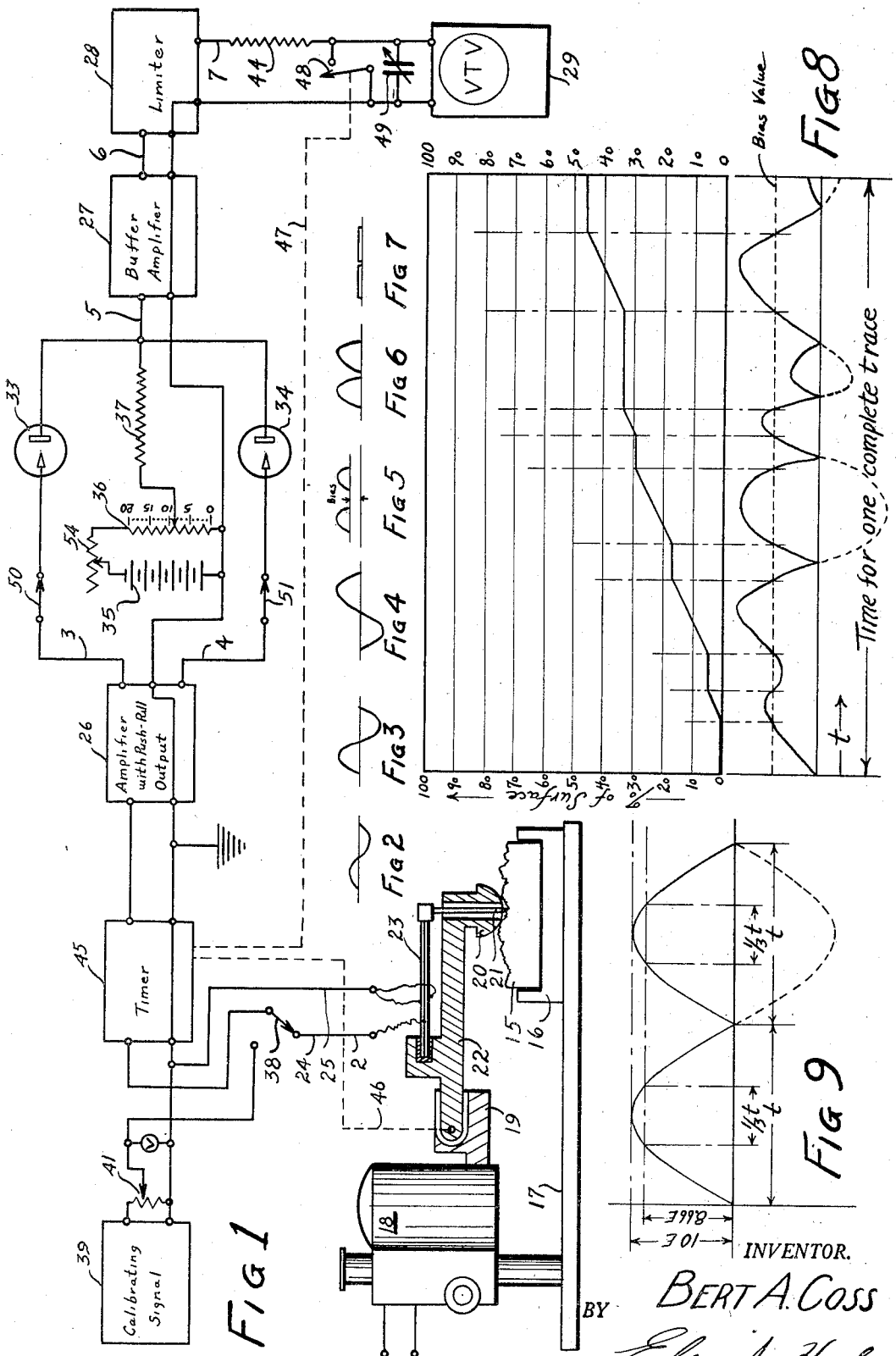

Patented Apr. 9, 1946

2,397,923

UNITED STATES PATENT OFFICE 2,397,923

ROUGHNESS MEASURING MEANS

Bert A. Coss, St. Louis Park, Minn., assignor to The Brush Development Company, Cleveland, Ohio, a corporation of Ohio Application February 26, 1943, Serial No. 477,242

15 Claims. (Cl. 73—105)

My invention pertains to improved apparatus for measuring roughness of surfaces; and more particularly to apparatus for giving the percentage of a surface which has a roughness which exceeds a certain set limit.

One of the known methods of attacking the problem of surface roughness measuring is to produce an alternating electric current corresponding to the minute irregularities and thereafter to make, automatically, a visually observable record corresponding thereto, such as a graph. Apparatus for that purpose may comprise a device analogous to a phonograph pickup of the hill-and-dale type having a stylus that is resiliently held in contact with the surface undergoing test, and simultaneously is moved transversely thereof. The pickup may be of the electromagnetic type that gives a varying output voltage proportional to the velocity of movement of the stylus in the vertical direction as it follows the surface irregularities, exemplified by the United States patent to Abbott 2,240,278, or it may be of the type including a piezoelectric crystal element. A device of the latter type is employed in the Surface Analyzer manufactured and sold by The Brush Development Company of Cleveland, Ohio; it provides an output potential proportional to the excursions of the tracing stylus when the pickup is moved over a surface, which output, after amplification, may be utilized to actuate a pen recorder, or, if a permanent record is not desired, to control the deflection of the beam in a cathode ray oscilloscope, or to control a meter.

Roughness measuring devices of the general type referred to have given excellent results in service; they do have certain limitations, however, which are overcome by the present invention. For example, when measuring either the average or the root-mean-square roughness of a surface, usually expressed in microinches, difficulty sometimes is experienced because the surface, if extended, may vary in its average roughness from point to point. Accordingly, a meter which is intended to indicate either the average or the root-mean-square of the displacement of a stylus that scans such a surface under test will give a continuously varying reading. The reading, to say the least, may be somewhat ambiguous and the ambiguity may increase in proportion to the extent of longitudinal travel of the stylus.

It is, accordingly, an object of my invention to provide an apparatus for roughness measuring that shall give a single definite indication devoid of ambiguity.

Another object of my invention is to provide apparatus for roughness measuring that will give an unequivocal indication of the amount of surface having a roughness which exceeds a fixed amount.

An object of my invention is to provide means for measuring a new value of surface quality.

A further object of my invention is to provide a circuit for use with a surface measuring device which will read the percentage of time that the ridges or scratches in a surface exceed a set tolerance limit.

It is also an object of my invention to provide a surface measuring device which will read the percentage of time that the ridges or scratches in a surface exceed a set tolerance limit, and to have the value of the tolerance selectively adjustable.

Another object of my invention is to be able to count the peaks which exceed a certain fixed amplitude limit.

Still another object of my invention is to provide the means for determining the amplitude distribution of a rough surface.

Other objects and a fuller understanding of my invention will be best understood from the following description and claims, when read in connection with the accompanying drawings, in which:

Figure 1 is a conventionalized view, partly diagrammatic and partly in cross-section, showing one form of my invention.

Figures 2 to 7 inclusive show the effect of the circuit on a wave-form of a sinusoidal signal at different points in the circuit.

Figure 8 is a graph illustrating a wave-form and the progressive deflection caused by it on an indicating meter calibrated to read the percentage of time the roughness of a surface exceeds a certain fixed value.

Figure 9 shows a rectified sinusoidal wave.

Figure 10:
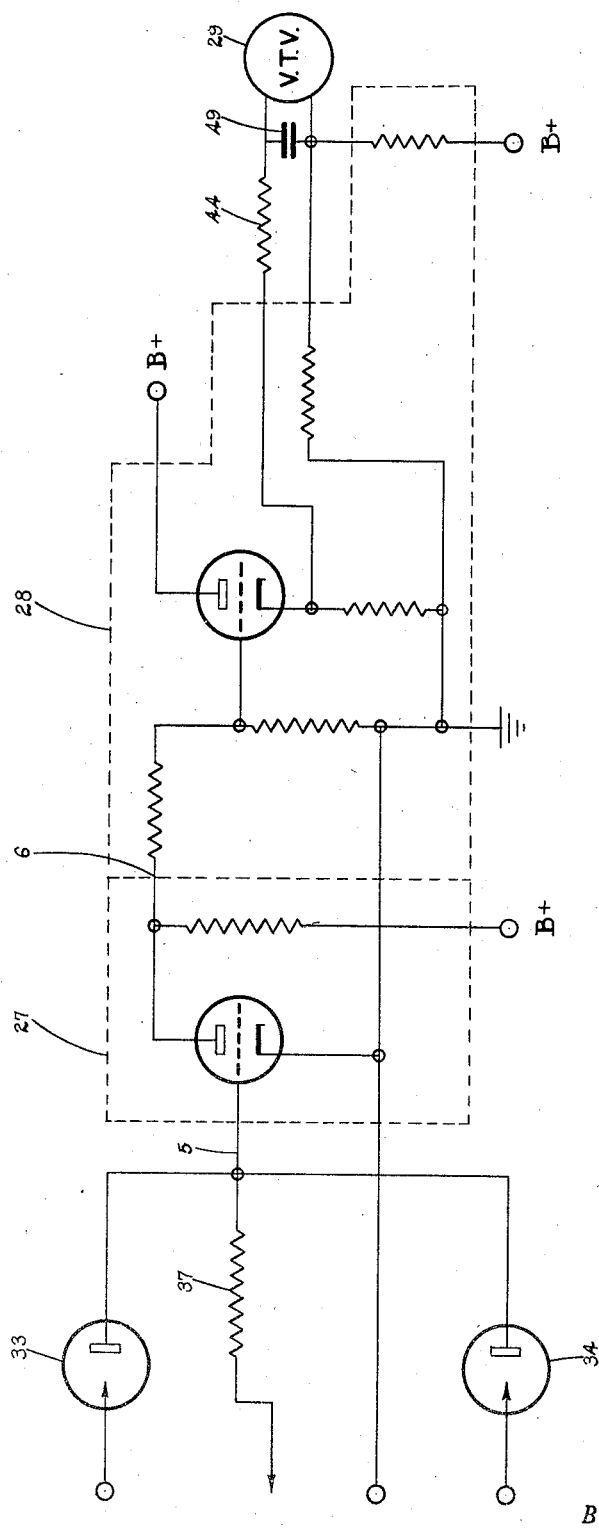
Figure 10 is a circuit diagram of a portion of the circuit of my device, showing the details of the buffer amplifier and the limiter.

In Figure 1 the specimen whose surface is to be measured is indicated by reference character 15, and is held in a holder 16 which rests on a base 17. The device for measuring the surface is indicated generally by reference character 18, and comprises a motor drive system for reciprocally actuating the arms 19 and 22 to move the two styli 20, 21 across the surface of specimen 15. The stylus 20 is large to prevent it from following the small surface scratches and to enable it to bear the weight of the arm 22 which is pivotally connected to arm 19. The stylus 21 has a sharp point which enables it to follow the small scratches, and it is connected to a piezoelectric crystal 23, which may be of the Rochelle salt type, and which is connected to the arm 22. For large surface waviness both styli 20, 21 are actuated, thereby causing arm 22 to pivot with respect to arm 19. There will be little or no voltage output from the piezoelectric crystal because there will be substantially no relative motion between the two styli. When the specimen has surface roughness as well as surface waviness there will be a differential motion between the two styli 20, 21 which will stress the crystal 23 and result in a voltage output between lines 24, 25 bearing a relationship to the amount of the differential motion. The voltage output is fed to an amplifier 26 which has a push-pull output, through a full-wave rectifier, and then through a buffer amplifier 27 to a limiter 28, and then to a vacuum tube voltmeter 29.

The output circuit of the amplifier 26 includes two rectifier tubes 33, 34, connected in a full wave rectifier circuit and developing rectified signal across the resistor 37. In series with the load resistor 37 in a bias battery 35 and a bias adjusting potentiometer 36. The battery 35 is poled to oppose the flow of current through the rectifiers 33, 34, and as a result current flows only when the signal peaks exceed the bias. The amount of bias can be manually regulated by the potentiometer 36 to adjust the value at which the tubes 33, 34 become conducting.

The signal which is passed to the limiter 28 comprises the positive and negative peaks of the cycles which exceed the bias values set by the battery 35 and the potentiometer 36. The limiter serves to chop off and throw away the positive and negative peaks of the cycles, and the value at which the limiting action commences should be just slightly greater than the value of the bias on the full wave rectifier. The output of the limiter thus consists of a series of unidirectional current pulses of equal amplitude but of varying duration related to the length of time for which the corresponding peaks exceed the limiting value. These unidirectional pulses charge condenser 49 through resistor 44. The resistor 44 should be so large that the condenser 49 is able to charge up to only a small fraction of the voltage of the pulsating output of the limiter 28 during one stroke of the pickup over the specimen, even though the rectifier bias is set so low that the limiter output is substantially continuous. The charge on the condenser 49, and hence the voltage across it, is a measure of the total length of time during which the roughness peaks exceeded the set limiting value, and the vacuum tube voltmeter 29 indicates the voltage across the condenser 49. Preferably the output impedance of the limiter should be extremely high during intervals between pulses so that condenser 49 will not tend to discharge back through the limiter. The circuit should be so designed that when the potentiometer 36 is set for zero bias a full trace of the stylus system across the specimen will develop a voltage across the condenser 49 which will cause the vacuum tube voltmeter 29 to read full scale. This indicates that 100 percent of the irregularities of the specimen surface exceed a roughness value corresponding to zero bias.

Two components of the circuit need calibration. The first is that part of the circuit which measures the percentage of time during which the roughness of the surface exceeds the set limit, and comprises the limiter 28, resistor 44, condenser 49, and the vacuum tube voltmeter 29; and the second is that part of the circuit by which the limit is set, and comprises the entire circuit from the timer 45 to the input of the buffer amplifier 27, and depends upon the sensitivity of the pickup system which must be known.

The calibration of the first component of the circuit is performed by throwing the switch 38 to connect the output of the calibrating signal supply 39 to the input of the amplifier 26, and by adjusting the potentiometer 36 so that there is no bias on the tubes 33, 34. The amplitude of the alternating signal from the supply 39 should be great enough to cause limiting action substantially completely over each half-cycle, and due to the timer 45 the signal is applied to the meter for a period of time corresponding to the length of time for one trace of the stylus across the specimen. The vacuum tube voltmeter will then give a reading which should be 100%, indicating that a signal is being applied to it substantially all of the time. If the meter does not read 100% the condenser 49 should be adjusted and the calibrating process repeated until the proper reading is obtained. Means other than using a variable condenser 49 could be used, such, for example, as means for adjusting the voltmeter 29.

The calibration of the second component of the circuit is based on the fact that the output of the pickup system for a given stylus displacement is known, and on the fact that for a sine wave of known amplitude it is possible to compute the percentage of time that the wave exceeds any given level, and therefore it is possible to calibrate the potentiometer 36 which is used to set the given level. I introduce from the calibrating signal supply 39 into the circuit to be calibrated a sine wave having an amplitude related by a known factor to the amplitude of the pickup output for a given stylus displacement. Then the potentiometer is set for a convenient known reference level, and the amount of current from battery 35 is adjusted by means of the variable resistor 54 until the meter 29 (which has already been calibrated) reads the correct percentage of time that the wave exceeds the set limit.

The principle of the calibration method and the procedure to follow may best be illustrated by a numerical example which will also indicate some factors to be considered in designing a surface measuring device of this type.

Assume that it may be desirable to set the reference level by means of the potentiometer 36 at any value up to 20 micro-inches of roughness. The potentiometer 36 would then be provided with a linear scale reading from zero to 20 micro-inches; each single division representing a resistor value corresponding to one micro-inch of surface roughness. Also assume from the manufacturer's specifications relating to the pickup system that it is known that the pickup delivers 1.2 millivolts per micro-inch of stylus displacement. Then the sinusoidal output signal from the calibrating signal source 39 is adjusted by means of the potentiometer 41 to have a peak value conveniently related to the output of the pickup, say of 12 millivolts, which corresponds to a stylus displacement of the pickup system of 10 micro-inches. Set the bias potentiometer at some predetermined convenient value, say, for instance, a resistor value corresponding to 8.66 micro-inches. It is easy to determine that for a sine wave having an output of 10 units, the wave exceeds a level of 8.66 units one-third of the time. This relationship is illustrated in Figure 9 in which the amplitude of the peaks of the rectified sinusoidal signal have a value of 10 units and the bias has a value of 8.66 units. The time $t$ during which the signal exceeds the bias can be computed as 33⅓ percent of the time. Therefore, adjust the amount of current flowing from battery 35 through the potentiometer 36 by means of the variable resistor 54 until one trace of the pickup causes the meter 29 to read 33.3 percent.

After calibrating both components of the circuit, the switch 38 is thrown to connect the output of the crystal 23 to the amplifier 26, and the potentiometer 36 is adjusted to set any desired bias value. The value of the bias set by the potentiometer 36 and the roughness quality of the surface of the specimen 15 determine the reading on the meter 29. For instance, a specification might read that not more than 10 percent of a surface have roughness which exceeds 20 micro-inches. The potentiometer 36 is then set to establish a bias which corresponds to 20 micro-inches, and the motor in the surface measuring device 18 is started to cause the styli 20, 21 to move across the surface of the specimen. All roughness encountered by the stylus 21 which is less than 20 micro-inches will fail to establish a voltage of sufficient magnitude to pass current through the rectifiers 33, 34, but each portion of the surface which has roughness exceeding 20 micro-inches will establish a voltage which causes either tube 33 or tube 34 to pass a current that produces an indication on the meter 29. The meter 29 gives a reading of the percentage of time during a complete stroke or trace of the stylus system across the specimen that the roughness is greater than the set limit of 20 micro-inches. The meter 29 is calibrated and all readings should be taken with a complete stroke or trace of the stylus across the specimen. Any length of trace may be used but we prefer to utilize one-half cycle of the reciprocating arm 19. The length of trace on usual devices is on the order of a fraction of an inch, but it is obvious that any other length of trace, either larger or shorter may be utilized. It is also obvious that if the meter 29 is calibrated with respect to a complete trace of the stylus system across the specimen, and during the testing of a specimen the meter 29 is read at some portion of the trace other than the complete trace, then the reading for a complete trace can be computed. For example: if the meter 29 is read at a time when the stylus system has completed one-half of the trace, then a substantially true reading can be found by multiplying the meter reading by two.

A timing device 45 is provided for regulating the length of time the output signal from the crystal 23 is applied to the meter 29. The timer 45 may be an accurate clock device, an electronic timer, or a mechanical switch. As shown, it is mechanically or electrically connected by line 46 to the reciprocating arms 19, 22 and is mechanically or electrically connected by line 47 to a switch 48 across the input circuit to the meter 29. The connections are such that when the stylus system starts its trace across the specimen the circuit from the crystal 23 to the meter is made through the timer 45, and the switch 48 is open; and at the end of the trace the circuit from the crystal 23 to the meter 29 is broken. After a time interval sufficient for an operator to read the meter 29 and preferably during the return stroke of the reciprocating arms 19, 22, the timer automatically closes switch 48 to discharge the condenser 49 and reduce the meter reading to zero preparatory to the next reading. It is not essential that the timer automatically close the switch 48 as the operator could easily do it by hand just prior to each test.

Figures 2 to 7 inclusive illustrate on a sine wave what happens to a signal generated by the crystal 23. Figure 2 illustrates the wave shape of an unamplified sine wave signal between the leads 24, 25. Figure 3 illustrates the appearance of the signal across one output circuit of the push-pull amplifier 26 prior to rectification such as at point 3; and Figure 4 illustrates the appearance of the signal across the other output circuit of the push-pull amplifier 26 prior to rectification such as at point 4. Figure 5 illustrates the shape of the wave at point 5 in the circuit showing the effect on the signal of full wave rectification and the bias supplied by the battery 35. Figure 6 shows rectified signal after further amplification such as at point 6 in the circuit, and Figure 7 illustrates the effect of the limiter 28 on the signal as it appears across the input to the vacuum tube voltmeter 29, such as at point 7. Each successive pulse charges the condenser 49 to an extent depending upon its length, and the vacuum tube voltmeter 29 reads the voltage across the condenser 49 corresponding to the accumulated charges produced by the successive pulses, thereby giving a reading which is an indication of the percentage of the surface having a roughness exceeding a value set by the bias.

Figure 8 illustrates graphically how the charge is built up on the condenser 49 during a trace across a surface which is very rough. Starting at zero percent as the stylus starts its trace, the charge increases due to each signal which exceeds the set bias. Each horizontal portion of the curve represents periods when peaks fall short of the limiting value established by the bias battery 35 and potentiometer 36; and each rising portion of the curve represents periods when the condenser is being charged by pulses corresponding to peaks which exceed the limiting bias.

If it is desired to obtain a reading of the percentage of the surface which has peaks or which has scratches exceeding a certain limit, separate bias controls, one for each rectifier tube 33, 34 should be used instead of the one shown, in order to provide independently adjustable reference levels for peaks and scratches. For obtaining a reading of the percentage of the surface which has scratches exceeding a certain limit, the limit would be set by the bias value of the potentiometer to obtain the desired limit, and the switch 50 opened. Signals corresponding to ridges in the specimen will not pass to the meter 29 but signals corresponding to scratches in the specimen will, and the meter 29 will therefore indicate the percentage of the surface of the specimen which has scratches exceeding the set limit. If it is desired to obtain a reading of the percentage of the surface which has ridges exceeding a certain limit the bias value is set and a trace made with switch 50 closed and switch 51 opened. Obviously for these types of readings the device must be recalibrated.

To determine the number of peaks of the surface which exceed a certain adjustable limit the output from my circuit may be integrated and put through a half-wave rectifier. The output is then applied to the meter which gives a reading proportional to the number of peaks which exceed the set limit. By running a number of traces with a series of different bias-values the amplitude distribution of the surface roughness can be determined.

In some applications it may be undesirable to employ the timer 45 and the meter reset switch 48. A modification of the circuit will permit this although the readings are apt to be somewhat less reliable, but yet commercially usable. One way of modifying the circuit is to omit the timer and switch and to connect a "leak" resistance in parallel with condenser 49. With this arrangement the limiter supplies pulses which tend to charge the condenser 49 and the leak tends to discharge the condenser. The result is an "average" charge on the condenser depending on the percentage of time that pulses flow (caused by peaks exceeding the bias value). When the wave form of the voltage applied to the amplifier 26 is "regular" as is the case when the sine wave calibrating voltage is applied, the meter will assume, after some short time delay, a steady reading which will be correct if the previously described calibrating procedure is followed (except that the length of time of applying the test signal need not be controlled beyond insuring that the meter has reached a steady value). For irregular wave forms such as are encountered in measuring the usual surface, the meter reading will fluctuate somewhat like the action of the meter in present average or "RMS" reading instruments.

Another modification would be to replace the vacuum tube voltmeter 28, condenser 49, leak, and resistor 44 by an A. C. voltmeter having considerable inertia and damping.

Although I have described my invention with a certain degree of particularity, it is to be understood that the present disclosure has been made only by way of example and that numerous changes in the details of construction and the combination and arrangement of parts may be resorted to without departing from the spirit and the scope of the invention as hereinafter claimed.

I claimed as my invention:

1. In combination, an electrical pickup device of the type including carrier means on which are mounted a movable stylus and means operable by said stylus for generating a fluctuating electrical quantity related to excursions of said point with respect to the carrier means, means for amplifying the electrical quantity, means for limiting the peaks of the electrical quantity at a certain value, means for producing a signal constant in amplitude and varying in duration in accordance with the lengths of time the peaks of the fluctuating electrical quantity are limited, means for integrating said signal with respect to time, and means for measuring the integrated quantity to provide an indication of the percentage of a surface which exceeds a certain roughness value related to the value set on the said limiting means.

2. A device as set forth in claim 1 in which the certain value set on the limiting means is adjustable.

3. In combination, an electrical pickup device of the type which establishes a fluctuating electrical quantity related to excursions of a stylus induced by relative movement between said stylus and a surface being investigated, means for establishing said fluctuating electrical quantity in accordance with motions of said stylus in a direction substantially normal to the direction of said relative movement, means for amplifying said electrical quantity, means for rectifying said electrical quantity, means for limiting the peaks of the electrical quantity, means for establishing a signal constant in amplitude and varying in duration in accordance with the time the peaks of the fluctuating electrical quantity are limited, means for integrating the constant signal with respect to time, and means for measuring the integrated output.

4. A device as set forth in claim 3 in which said rectifying means includes bias means.

5. A device as set forth in claim 3 in which said rectifying means is a half-wave rectifier.

6. In combination, an electrical pickup device of the type including carrier means on which are mounted a movable stylus and means operable by said stylus for establishing a fluctuating electrical quantity related to excursions of said stylus with respect to the carrier means, means for amplifying said electrical quantity and having a push-pull output, a full-wave rectifier connected to the output of said amplifier, bias means connected to said rectifier for passing only the peaks of said fluctuating signal, limiter means connected to the output of said biased rectifier for limiting the peaks of said fluctuating signal, integrating means for integrating said biased and limited signal with respect to time, and means for measuring said integrated signal.

7. A device as set forth in claim 6 in which said bias means are adjustable.

8. A device as set forth in claim 6 in which the limit set by said limiter is adjustable.

9. A device as set forth in claim 6 in which said bias means are adjustable, and in which the limit set by said limiter is adjustable and is set slightly higher than the value set by the bias means.

10. In combination, an electrical pickup device of the type including carrier means on which are mounted a movable stylus and means operable by said stylus for establishing a fluctuating electrical quantity related to excursions of said stylus with respect to the carrier means, a source of constant amplitude electrical current, current measuring means, means for setting a reference level for said fluctuating electrical quantity, and means for connecting the source of constant amplitude electrical current to said current measuring means only during the time that the value of the fluctuating electrical quantity exceeds the value of the set reference level.

11. A device as set forth in claim 10, further characterized by the said current measuring means being of the integrating type.

12. A device as set forth in claim 10, further characterized by the said current measuring means being of the integrating type, and the means for setting the said reference level is an adjustable means.

13. In a device for measuring the roughness of the surface of a specimen and having an electrical pickup device of the type adapted to establish a fluctuating electrical quantity related to roughness induced excursions of a stylus as said stylus and the specimen are moved relative to each other, the combination of means for amplifying said electrical quantity and having a push-pull output, means for rectifying said electrical quantity, means for setting a reference level for said fluctuating electrical quantity, a source of constant amplitude electrical current, means for measuring electrical current, and means for connecting the source of constant electrical current to said current measuring means only during the time that the value of the fluctuating electrical quantity exceeds the value of the set reference level.

14. A device as set forth in claim 13, further characterized by said current measuring means being of the integrating type.

15. A device as set forth in claim 13 further characterized by switch means in the push-pull output of said amplifier for selectively connecting either one or both of the amplifier outputs to said means for measuring electrical current whereby there is obtainable a measurement of surface roughness peaks or surface roughness valleys or total roughness exceeding a certain value corresponding to the roughness value of the set reference level.

BERT A. COSS.